(12) United States Patent
Brew et al.

(10) Patent No.: US 6,299,813 B1
(45) Date of Patent: Oct. 9, 2001

(54) MODIFIED SLOT EXTRUSION DIES

(75) Inventors: Thomas W. Brew; W. Neil Peters; Mark A. Shalkey, all of Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/401,713

(22) Filed: Sep. 23, 1999

(51) Int. Cl.$^7$ .................................................. B29C 47/12
(52) U.S. Cl. ................... 264/177.12; 264/211.11; 264/209.8; 425/461; 425/463
(58) Field of Search ................ 264/177.12, 211.11, 264/209.8, 630; 425/463, 462, 461

(56) References Cited

U.S. PATENT DOCUMENTS

| | | |
|---|---|---|
| 2,526,423 | 10/1950 | Rudorff . |
| 3,038,201 | 6/1962 | Harkenrider . |
| 3,790,654 | 2/1974 | Bagley . |
| 3,885,977 | 5/1975 | Lachman et al. ................ 106/62 |
| 3,905,743 | 9/1975 | Bagley ............................ 425/464 |
| 4,205,213 | 5/1980 | Inoue ............................ 219/69 W |
| 4,233,486 | 11/1980 | Inoue ............................ 219/69 W |
| 4,235,583 | 11/1980 | Reed ............................... 425/464 |
| 4,259,057 | 3/1981 | Abe et al. ....................... 425/463 |
| 4,373,895 | 2/1983 | Yamamoto et al. ............ 425/461 |
| 4,403,131 | 9/1983 | Cunningham et al. ........ 219/69 W |
| 4,527,035 | 7/1985 | Majestic ........................ 219/69 W |
| 4,883,420 | 11/1989 | Ozaki et al. ................... 425/464 |
| 4,902,216 | 2/1990 | Cunningham et al. ........ 425/463 |
| 4,992,233 | 2/1991 | Swaroop et al. ................... 419/2 |
| 5,011,529 | 4/1991 | Hogue et al. ...................... 75/235 |
| 5,171,503 | * 12/1992 | Peters et al. ................. 264/177.11 |
| 5,320,721 | 6/1994 | Peters ............................. 204/129.1 |
| 5,322,599 | 6/1994 | Peters ............................. 204/129.2 |
| 5,487,863 | * 1/1996 | Cunningham et al. ...... 264/177.11 |
| 5,489,756 | * 2/1996 | Seely ............................... 219/69.12 |
| 5,507,925 | 4/1996 | Brew ................................. 205/660 |
| 5,702,659 | 12/1997 | Kragle et al. ................. 264/177.11 |
| 5,876,804 | 3/1999 | Kodama et al. ................. 427/436 |
| 5,997,720 | * 12/1999 | Brew et al. ...................... 205/646 |
| 6,080,348 | * 6/2000 | Shalkey ........................ 264/177.12 |

FOREIGN PATENT DOCUMENTS

| | | |
|---|---|---|
| 0 228 258 | 7/1987 | (EP) . |
| 0 276 083 | 7/1988 | (EP) . |
| WO 99/20445 | * 4/1999 | (WO) . |

* cited by examiner

Primary Examiner—Jan H. Silbaugh
Assistant Examiner—Mark Eashoo

(57) ABSTRACT

A honeycomb extrusion die comprising a die body incorporating an inlet face, a discharge face opposite the inlet face, a plurality of feedholes extending from the inlet face into the body, and an array of intersecting discharge slots extending into the body from the discharge face and interconnecting with the feed holes, the intersecting discharge slots being formed by the side surfaces of a plurality of pins bounded by the slots and extending into the die body from the discharge face, wherein a plurality of the pins include one or more multi-textured side surfaces, each side surface including at least two surface regions differing in surface finish from each other.

9 Claims, 3 Drawing Sheets

MODIFIED SLOT EXTRUSION DIES

BACKGROUND OF THE INVENTION

The present invention relates to extrusion dies for the continuous extrusion of fine honeycomb structures from plasticized inorganic powder mixtures, and more particularly to honeycomb extrusion dies comprising improved discharge slot surface finish profiles that impart more uniform and stable extrusion characteristics to the dies.

The manufacture of inorganic honeycomb structures from plasticized powder batches comprising mineral or other inorganic powders dispersed in appropriate binders is well known. U.S. Pat. Nos. 3,790,654, 3,885,977, and 3,905,743 describe dies, processes and compositions for such manufacture, while U.S. Pat. Nos. 4,992,233 and 5,011,529 describe honeycombs of similar cellular structure extruded from batches incorporating metal powders.

The manufacture of extrusion dies for the production of ceramic honeycombs by these methods requires extremely precise machining. To supply material to the die for forming the honeycomb product, the inlet or supply face of the die is provided with multiple apertures or feed holes into which the plasticized batch material to be extruded is forced under high pressure.

The opposing discharge or outlet face of the die is provided with a criss-crossing array of finely machined discharge slots, these slots being cut into the discharge section of the die so that they intersect the holes of the feed hole array. These slots operate to finally shape the plasticized batch supplied through the feed holes into the interconnecting wall structure of the extruded honeycomb.

The islands of material between the intersecting discharge slots that together form the outlet face of the die are sometimes referred to as "pins", since due to the removal of the slot material they appear as free-standing metal posts extending outwardly from the die interior. The cross-sectional end shapes of these pins, which are attached to the die body only at their bases, define the shapes of the honeycomb channels formed by the extruding plasticized batch.

A number of techniques have been employed to form the intersecting discharge slots and pins in the discharge surfaces of metal honeycomb extrusion dies. For mild steels, the discharge slots may be formed by sawing. However, if the die is to be cut from a harder, slower wearing material such as stainless steel, electrical discharge machining or abrasive wheel slitting are more widely used.

In the electrical discharge machining (EDM) process, the discharge slots are formed through an electrical discharge maintained between a long, thin, traveling electrode wire and the metal die preform. U.S. Pat. Nos. 2,526,423, 4,205, 213, 4,233,486, 4,403,131 and 4,527,035 provide detailed descriptions of EDM processing. Slot lengths formed by wire EDM in these dies can be 3½ inches in length or more, and slot depths greater than 0.1 inches with slot widths of 0.012 inches or less can be provided. In general, slots formed in stainless steels by EDM methods are substantially free of burrs and have a relatively smooth and consistent surface finish.

The abrasive wheel slitting process typically involves the use of a diamond or other abrasive-impregnated cutting wheel to slice the narrow discharge slots into the face of the die. Abrasive wheel slitting produces discharge slots of substantially smoother surface finish than even EDM slotting, and has the further advantage that it is not subject to process disruptions from variations in electrical discharge conditions. Slots produced by this process should theoretically reduce slot flow rate variability to insignificant levels.

However, while both of these machining processes have been adapted to the commercial production of honeycomb extrusion dies, neither produces dies with completely satisfactory extrusion performance. Remaining problems, even with abrasive wheel slitting, include uneven flow effects such as "fast flow" (accelerated extrusion through localized regions of a die), which can produce a variety of honeycomb product defects. Such defects include "swollen" or "rippled" webs wherein the cell walls of the honeycomb are thickened, or are wavy in transverse and/or longitudinal directions, due to the local extrusion of excess material at one or more apparently random locations across the die outlet face. Other variations in cell dimensions, cell shapes, and cell wall thicknesses can also be produced.

In many cases surface finish irregularities within the feed hole sections of the extrusion dies are considered to be major contributors to uneven flow. In other instances variations in extrusion batch viscosity are thought to play a role.

Regardless of the cause of such defects, maintaining exact geometry in extruded honeycomb products has become increasingly difficult as the demand for honeycomb products of finer and finer channel wall structure and increased channel count or cell density has increased. For this reason, there remains a critical need to improve both the designs and the machining techniques used for extrusion die fabrication, particularly for thin-walled, high-cell-density products, so that these products can be manufactured at an economical cost.

SUMMARY OF THE INVENTION

The present invention provides honeycomb extrusion die designs offering significant improvements in flow uniformity and stability, not only for the extrusion of very thin-walled honeycombs but for the extrusion of conventional honeycombs as well. These improvements result from the use of an improved discharge slot design incorporating "multi-textured" slot surfaces, i.e., slot surfaces formed by pins that incorporate surface regions of at least two different surface finishes.

Multi-textured pin or slot surfaces are unexpectedly effective in suppressing batch flow irregularities arising from small, unavoidable variations in feedhole and discharge slot geometry or finish produced by prior art machining procedures. Further, multi-textured slot surfaces are a more cost-effective way to achieve exact substrate geometry than are known techniques for reducing the variability of such geometries.

The multi-textured pin surfaces used in accordance with the invention include smooth surface portions of very low surface roughness in combination with somewhat less smooth portions of higher surface roughness. The smooth and less smooth surface portions are disposed serially along the length of the pin surfaces connecting the feedhole ends to the outlet face ends of the pins, so that plasticized batch material traversing the discharge slots from the feedhole inlets to the die outlet face traverses the surface portions of differing surface finish in sequence, one after the other.

This variation in discharge slot surface roughness along the path of extrusion is thought to have the effect of masking batch flow variations which would otherwise arise from the variations in die geometry or batch viscosity present in prior art extrusion systems.

In a first aspect, then, the invention includes a honeycomb extrusion die of modified slot design, which may be otherwise conventional with respect to its composition, overall geometry, and feed-hole design. The die incorporates a conventional inlet face, an outlet face opposite the inlet face, a plurality of feedholes extending from the inlet face into the die body, and an intersecting array of discharge slots extending into the body from the outlet face to connect with the feed holes.

The discharge slots separate the outlet face into a plurality of pins, bounded by the slots and extending from the feedholes to the outlet face of the die. In the die of the invention the side surfaces of a plurality of the pins defining the discharge slots for the die include one or more multi-textured side surfaces, said side surfaces including at least two surface regions differing in surface finish from each other.

Preferably all of the pins defining the discharge slots for the die will include multi-textured side surfaces on some or all of their sides. And, if desired, each of the multi-textured side surfaces may additionally include a flow-modifying surface feature such as a groove or ledge separating the two regions of differing surface finish, to further mask any flow differentials arising from feedhole irregularities, batch inhomogeneities, or the like.

In a second aspect the invention offers an improved extrusion process which employs the modified flow characteristics of the die of the invention to form extruded honeycombs with fewer shape defects attributable to flow variations imparted by the die. In accordance with that process the plasticized batch material for the honeycomb shape is conventionally forced into a feed hole array in an inlet face of the honeycomb extrusion die, and is then caused to flow into and through a die discharge section comprising a criss-crossing array of discharge slots. The discharge slots are formed by an array of pins terminating at the outlet face of the extrusion die, the pins and slots forming the plasticized batch material into the desired honeycomb shape.

To achieve improved extrusion results in accordance with the invention, the batch material is formed at least in part by multi-textured side surfaces provided on all or a plurality of the pins in the array. Each of the multi-textured side surfaces has at least two surface regions differing in surface finish from each other. Flow alteration by these multi-textured side surfaces appears to substantially contribute to the significant reductions in extrudate flow front variations which are observed. These reductions in turn reduce product defects such as swollen or undulating web (channel wall) surfaces in the honeycomb products caused by flow variations through the dies.

DESCRIPTION OF THE DRAWINGS

The invention may be further understood by reference to the drawings, wherein.

DETAILED DESCRIPTION

Figure 1:
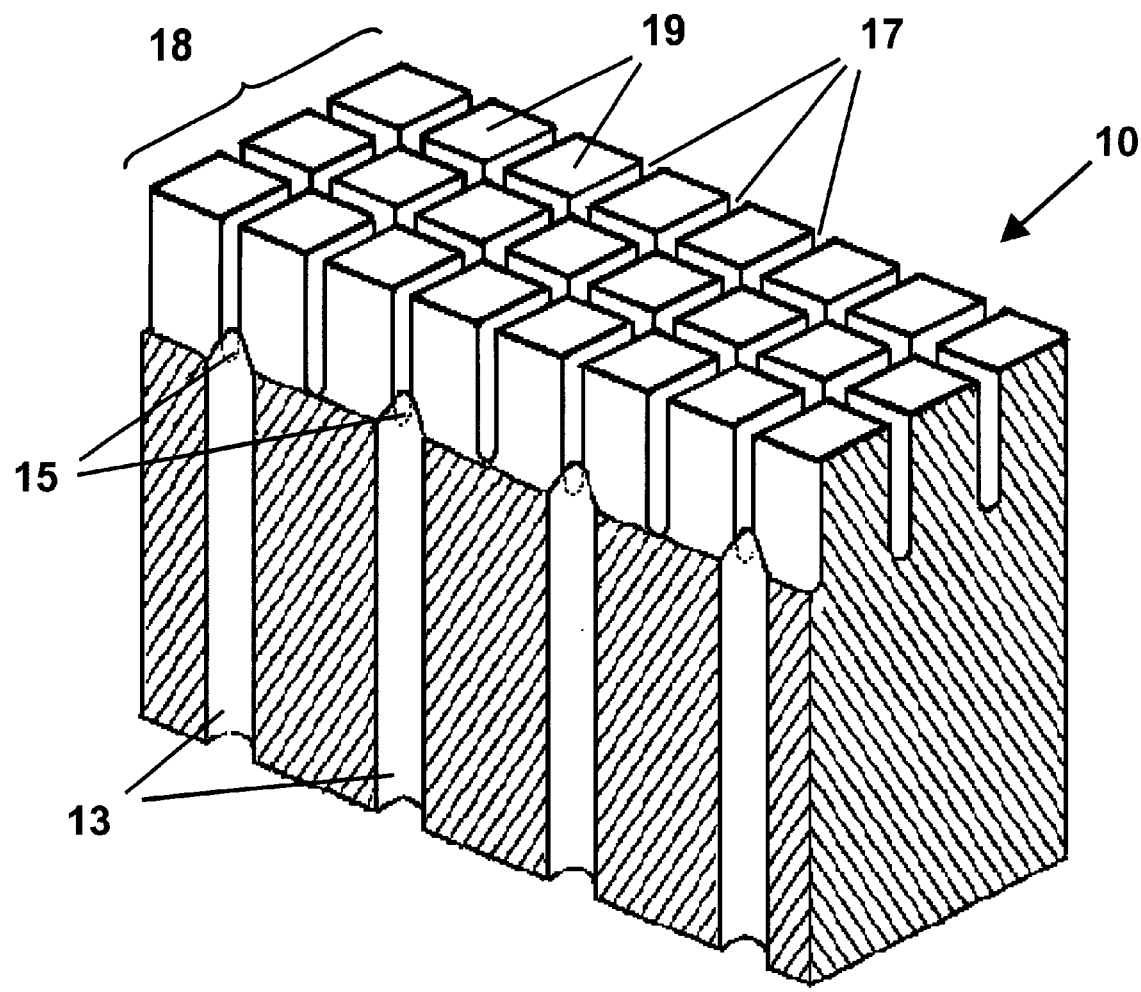
FIG. 1 is a schematic perspective view in partial cross-section of a section of a conventional honeycomb extrusion die.

Referring more particularly to the drawing, FIG. 1 is a schematic perspective view in partial cross-section of a section of a conventional honeycomb extrusion die of the kind employed in the art for the extrusion of ceramic honeycombs. As shown in that figure, extrusion die 10 comprises feed holes 13 extending upwardly from a die inlet face (not shown) through which extrudable batch material is conveyed to feed hole/slot intersections 15, and from there into discharge slots 17. Discharge slots 17 then convey the batch material upwardly to outlet face 18 of the extrusion die where it exits the die in the configuration of a honeycomb.

As will be apparent from a study of FIG. 1, discharge slots 17 are bounded or formed by the side surfaces of pins 19, the latter being formed as the discharge slots are formed. It is the side surfaces of pins 19 which form the walls of the slots and thus the walls of the honeycomb shapes as the batch material is extruded from the die.

The problem addressed by the present invention, i.e., that of "fast flow" through selected die sections leading to unacceptable distortions in honeycomb geometry, is particularly severe in the case of die designs for thinwall products. These are dies that have slot widths appropriate for producing honeycombs with web thicknesses below about 0.006 inches, more typically about 0.004 inches or less. As previously noted, while the use of abrasive wheel slitting can reduce slot finish variations and overall roughness to very low values, such reductions are not alone effective to control flow disruptions arising from other sources.

Some additional improvements in flow behavior can be achieved in abrasive wheel-slit dies through the use of flow-modifying features added to the die side surfaces, as described, for example, in published PCT patent application No. WO99/20445. However, even these features are not effective to fully control fast flow behavior in dies for thinwall products.

Figure 2:
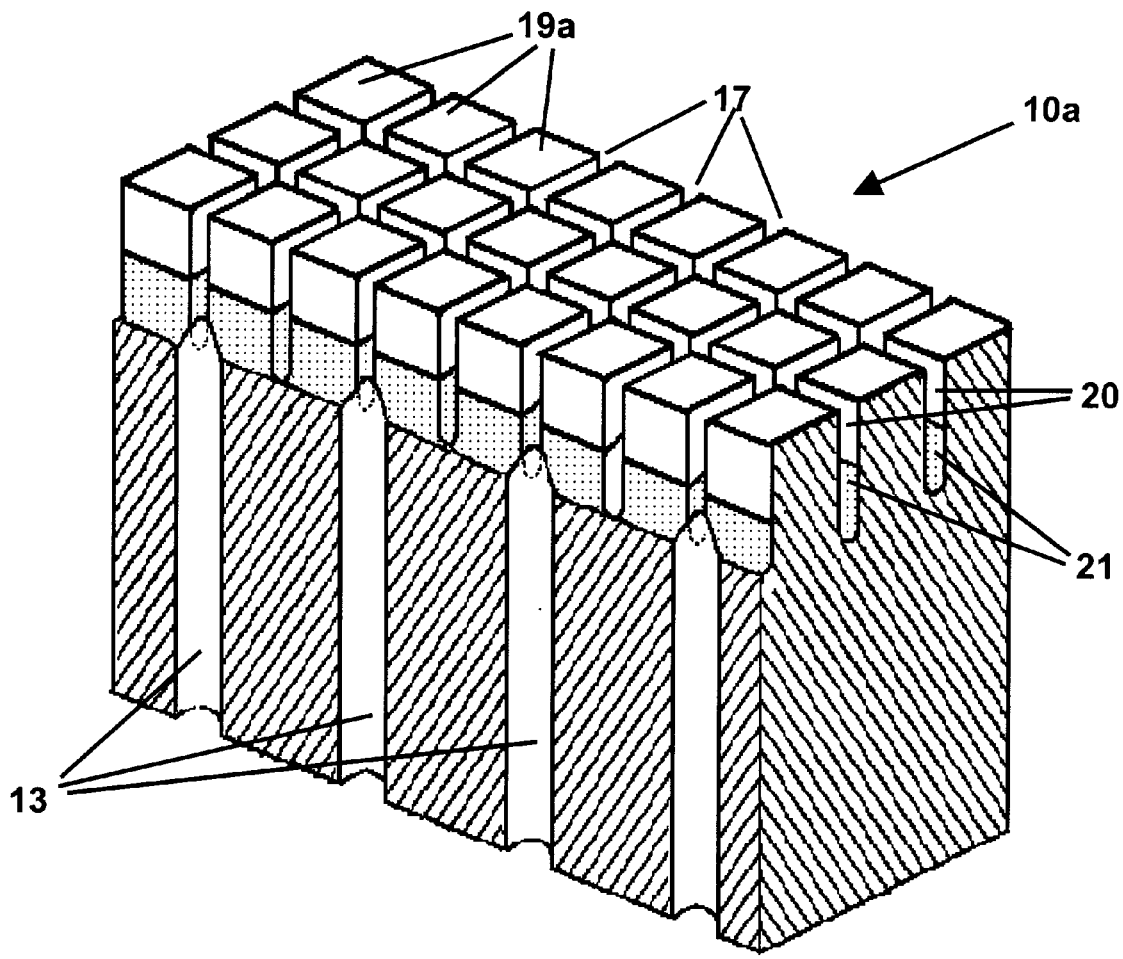
FIG. 2 is a schematic perspective view in partial cross-section of a section of a honeycomb extrusion die incorporating a multi-textured slot finish in accordance with the invention.

FIG. 2 of the drawing is a schematic perspective view in partial cross-section of a section of a honeycomb extrusion die provided in accordance with the invention. In that Figure, extrusion die 10a again comprises feed holes 13 extending upwardly from the die inlet face and intersecting with discharge slots 17 at the base of the discharge section of the die. In this embodiment of the invention, however, pins 19a bounding discharge slots 17 incorporate side surfaces having surface regions 20 and 21 that are of substantially different surface texture. In the embodiment shown, upper or outer side surface regions 20 adjacent the terminal ends of the pins have very high smoothness, whereas lower or inner side surface regions 21 are somewhat lower in smoothness.

The flow modifications resulting from the presence of multi-textured finishes on the side or forming surfaces of the pins will depend not only on the particular slot sizes and surface finishes selected, but also on factors such as the rheology of the material being extruded and the extrusion rates employed. In any case, however, the optimum surface finishes for any particular batch material, honeycomb shape, and/or extrusion condition may readily be determined by routine experiment.

For batch rheologies of the kind currently encountered in the production of extruded ceramics, and particularly for the production of extruded ceramic honeycombs, pin side surfaces including a first surface region having a surface roughness below about 0.5 micrometers (20 microinches) RA and a second surface region having a surface roughness above 0.75 micrometers (30 microinches) RA will normally be used. Relatively smooth first surfaces within the prescribed surface roughness range may readily be produced by methods such as the abrasive wheel slitting process, while second surface regions with surface roughness values above about 30 microinches can be provided by conventional wire EDM slotting techniques.

Some improvement in extrusion performance can be obtained without treating all side surfaces of all of the pins in the die to develop the desired surface textures. For example, it is possible to form the entire slot array by abrasive wheel slitting, and then to use wire EDM finishing to add roughness to surface portions of only the horizontal slots, or only the vertical slots, in the array.

However, best results are obtained when substantially all of the side surfaces of all of the pins in the discharge section of the die have been treated. Particularly preferred in such cases are machining procedures providing first surface regions with surface roughness in the range of 0.05–0.25 micrometers (2–10 microinches), and second surface regions with surface roughness in the range of 1.0–2.5 micrometers (40–100 microinches or more), on all of the pins to be contacted by the extruding honeycomb. Rougher second surface regions appear to provide better extruded ware quality than smoother second surface regions.

The relative positions of the first and second surface regions on the pins is not believed to be critical. However, positioning the first (smoother) side surface portions closer to the die outlet face than the second surface portions, and preferably extending the first surface portions outwardly to reach the outlet face of the die as shown in FIG. 2, may have an advantage where optimum smoothness in the extruded webs of the honeycombs is desired.

Also useful as optional features in the die designs of the invention are the geometrically designed, macroscopic, flow modifying pin surface discontinuities disclosed in published PCT patent application W099/20445. These discontinuities, which may be provided as recesses or protrusions (e.g., grooves or ridges) on all or a plurality of the pin side surfaces, may be helpful to further stabilize batch flow through the slots. In the case of a recess or groove oriented parallel with the outlet face of the die, such a feature can conveniently be machined into the pin side surfaces by wire EDM procedures at the same time that a roughened surface portion is provided by EDM machining of the lower portions of the same side surfaces.

Figure 3:
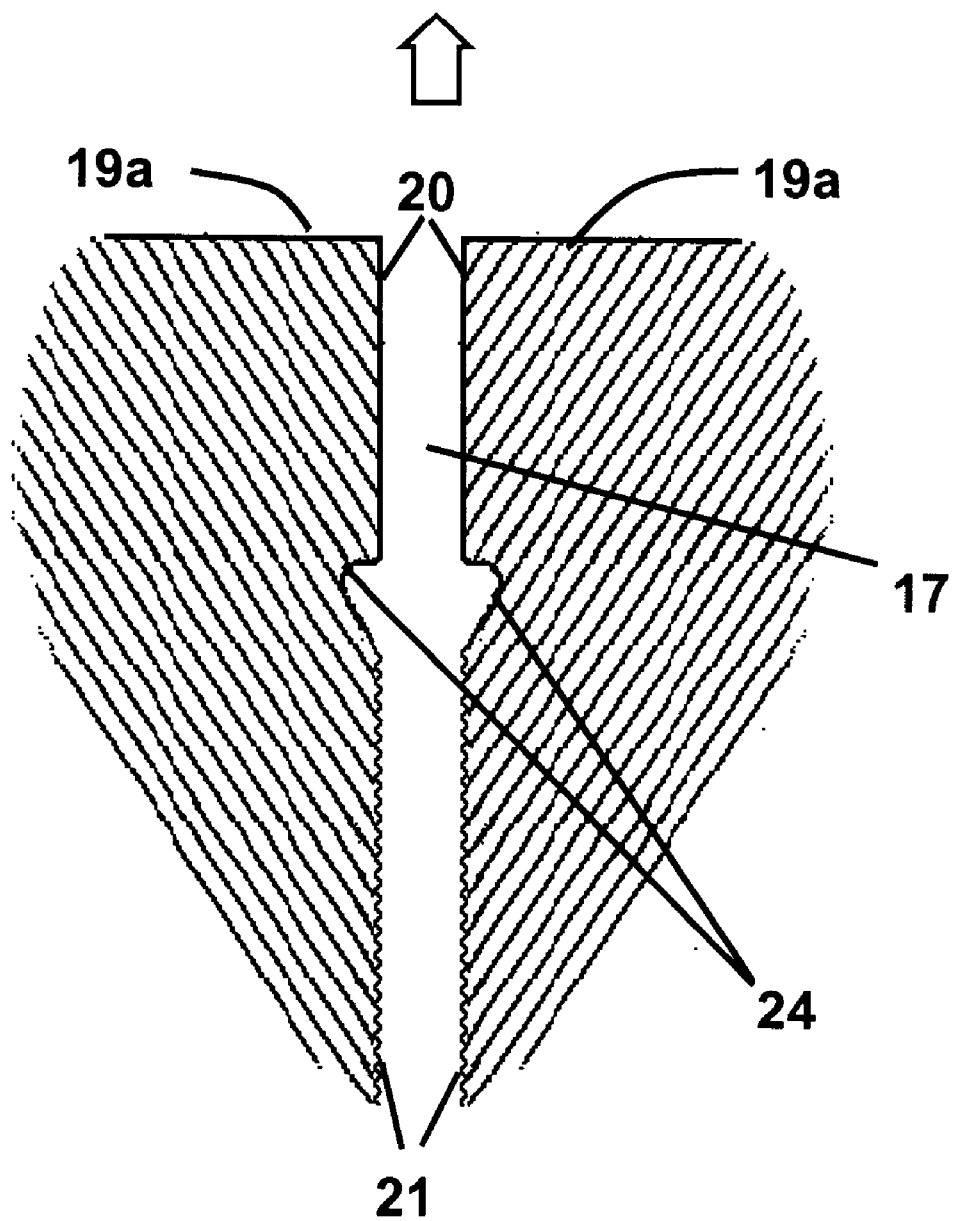
FIG. 3 is shows a design for a preferred slot design incorporating a multi-textured surface finish in combination with a boundary surface discontinuity separating the regions of differing finish on the surfaces of the slot.

FIG. 3 of the drawing illustrates a particularly preferred slot design of this type, showing two adjacent pins 19a with sidewalls forming a slot 17 and tops terminating at the outlet face of an extrusion die. This enlarged partial schematic cross-sectional view, taken through pins 19a in a plane transverse to the direction of discharge slot 17, shows recess or groove features 24 cut into opposing side surfaces of the selected pins 19a, i.e., into both sidewalls of the selected slot.

Side surface portions 21 of pins 19a, which are positioned below groove features 24 in this design, are textured as by EDM machining or other finishing methods so that they have a rougher surface finish than upper side surface portions 20. The latter, smoother regions extend from groove features 24 to the top of slot 17 at the outlet face terminations of pins 19a of the die.

The effects of pin surface multi-texturing on extrusion die forming characteristics is best illustrated by comparing the honeycomb extrusion performance of two examples of essentially similar dies, one example incorporating uniformly smooth pin surfaces and the other incorporating multi-textured pin surfaces formed by a combination of abrasive wheel grinding and EDM wire wheel finishing.

In a first such comparison, two stainless steel honeycomb extrusion dies configured to form square-celled honeycomb products having a fired cell density of about 350 cells/in2 of honeycomb frontal area are selected. The discharge slots on the outlet surfaces of the dies have a slot width of about 0.0055 inches and a slot depth of about 0.100 inches. However, one of the dies (conventional) has a smooth slot configuration, substantially similar to that schematically shown in FIG. 1 of the drawing, while the second die incorporates slots with both smooth and rough surface regions, similar to that shown in FIG. 2 of the drawing.

All of the slots in the first or conventional die are formed by abrasive Borazon™ wheel slitting, providing a very smooth and uniform slot finish to the full depth of the slots and across the entire outlet surface of the die. The slots in the second die are formed by a combination of Borazon™ wheel slitting and EDM refinishing to produce adjacent smooth and rough surface portions on the side surfaces of the pins.

To generate these surface portions on the pin surfaces of the second die, that die is first provided with slots of the full 0.100 inch depth by Borazon™ wheel slitting. Then, the inner or bottom portions of each slot are refinished by EDM wire machining. This is accomplished by positioning an EDM wire of about 0.004 inches diameter in each precut slot at a depth of about 0.05 inches below the outlet face of the die, and then refinishing those portions of the slot surfaces extending below that depth. At the same time, a shallow groove about 0.002 inches in depth is cut into the side surfaces of each pin at the boundary of the smooth and roughened slot portions, as a supplemental flow control measure.

The product of this slotting procedure is a die wherein each pin has side surfaces including an outermost smooth surface portion having a surface roughness of about 5 RA and a second inner surface portion of higher slot roughness (about 70 microinches RA) generated by the EDM wire refinishing.

The extrusion performance of these two dies is compared in extrusion trials during which honeycomb bodies of 350 cells/in2 cell density are formed with each die from a conventional ceramic batch material containing clay, talc and alumina mixed with organic binders in a water vehicle. Forming honeycombs at wall thicknesses below about 0.006 inches with such conventional batches is generally difficult, as demonstrated by the fact that the yield of "acceptable" product from the first extrusion die produced as above described (i.e., product acceptable for drying and firing) is typically in range of only about 30% of the material extruded. The remainder of the extruded product exhibits a variety of cell and cell wall shape defects known to be associated with flow irregularities through the die.

The second die, which incorporates the multi-textured slot design provided as above described, exhibits markedly better extrusion performance than the first die. Extrusion trials to produce 350 cells/in2 honeycomb product produce yields of greater than 90% of extruded ware suitable for drying and firing, from the same extrusion batch providing only 30% yields when formed using the first die. This result is directly attributed to a substantial reduction in defect-producing "fast flow" behavior caused by the improved slot design of the second die.

Similar performance improvements are observed during extrusion trials of stainless steel honeycomb extrusion dies designed for the production of ceramic honeycombs having a cell density of 600 cells/in2 and a cell wall thickness of 0.004 inches. The reduced cell wall thickness of these honeycombs makes successful extrusion even more difficult, with product yields being on the order of 10% using an extrusion die with abrasive (Borazon™) wheel finished discharge slots of uniform 20 microinch smoothness. In contrast, yields in excess of 60% are achieved with a 600-cell extrusion die having substantially the same multi-textured pin finish pattern as that of the second 350-cell honeycomb die described above, even without optimizing other manufacturing variables such as batch composition and extrusion rate.

As will be recognized by those skilled in the relevant arts, the foregoing description and examples are merely illustrative of the invention hereinabove described, and are not intended to be limiting. Accordingly, various modifications of the procedures and apparatus hereinabove described may be resorted to in the practice of our invention within the spirit and scope of the appended claims.

We claim:

1. A honeycomb extrusion die comprising a die body incorporating an inlet face, a discharge face opposite the inlet face, a plurality of feedholes extending from the inlet face into the die body, and an intersecting array of discharge slots extending into the body from the discharge face to connect with the feed holes, the intersecting array of discharge slots being formed by the side surfaces of a plurality of pins bounded by the slots and extending into the die body from the discharge face, wherein a plurality of the pins include one or more multi-textured side surfaces, said side surfaces including at least two surface regions differing in surface finish from each other, wherein the two surface regions include a first surface region having a surface roughness below 0.5 micrometers (20 microinches) and a second surface region having a surface roughness above 0.75 micrometers (30 microinches).

2. A honeycomb extrusion die in accordance with claim 1 wherein all side surfaces of the pins include the at least two surface regions, wherein the first surface regions have surface roughnesses in the range of 0.05–0.25 micrometers (2–10 microinches), and wherein the second surface regions have surface roughnesses in the range of 1.0–2.5 micrometers (40–100 microinches).

3. A honeycomb extrusion die in accordance with claim 1 wherein the first surface regions are positioned closer to the discharge face than the second surface regions, and wherein the first surface regions extend outwardly to the discharge face of the die.

4. A honeycomb extrusion die in accordance with claim 3 wherein the first and second surface regions are separated by a geometrically designed, macroscopic, flow modifying surface discontinuity.

5. A honeycomb extrusion die in accordance with claim 4 wherein the surface discontinuity is a surface recess in the pin surface.

6. A honeycomb extrusion die in accordance with claim 5 wherein the surface recess is a groove oriented parallel with the discharge face of the extrusion die having a depth that is equal to or within one order of magnitude of the width of the discharge slots.

7. In the method for forming a plasticized batch material into a honeycomb shape which comprises forcing the material into a feed hole array in an inlet face of a honeycomb extrusion die and flowing the material into and through a die discharge section comprising a criss-crossing array of discharge slots formed by an array of pins terminating at an outlet face of the die to form the material into the honeycomb shape, the improvement wherein the flowing material is formed at least in part by multi-textured side surfaces provided on at least a plurality of the pins in the array, each multi-textured side surface having at least two surface regions differing in surface finish from each other, the surface regions including a first surface region having a surface roughness below 0.5 micrometers (20 microinches) and a second surface region having a surface roughness above 0.75 micrometers (30 microinches).

8. A method in accordance with claim 7 wherein all of the pins are provided with side surfaces having at least two surface regions differing in surface finish from each other, the surface regions including a first surface region having a surface roughness in the range of 0.050–0.25 micrometers (2–10 microinches) and a second surface region having a surface roughness in the range of 1.0–2.5 micrometers (40–100 microinches).

9. A method in accordance with claim 8 wherein the first and second surface regions are separated by a surface discontinuity, and wherein the first surface regions are positioned closer to the discharge face of the honeycomb extrusion die than the second surface regions and extend outwardly to the discharge face.

* * * * *